US012338075B2

(12) United States Patent
Brehmer et al.

(10) Patent No.: US 12,338,075 B2
(45) Date of Patent: Jun. 24, 2025

(54) SELF-ALIGNING BELT PULLEY (71) Applicant: Brehmer Manufacturing, Inc., Lyons, NE (US)

(72) Inventors: Jamie C. Brehmer, Lyons, NE (US); Joey R. Brehmer, Lyons, NE (US)

(73) Assignee: Brehmer Manufacturing, Inc., Lyons, NE (US)

( * ) Notice: Subject to any disclaimer, the term of this patent is extended or adjusted under 35 U.S.C. 154(b) by 55 days.

(21) Appl. No.: 18/199,159

(22) Filed: May 18, 2023

(65) Prior Publication Data

US 2023/0373727 A1 Nov. 23, 2023

Related U.S. Application Data

(60) Provisional application No. 63/344,212, filed on May 20, 2022.

(51) Int. Cl.
*B65G 23/44* (2006.01)
*B65G 39/16* (2006.01)
*B65G 15/64* (2006.01)

(52) U.S. Cl.
CPC ............. *B65G 23/44* (2013.01); *B65G 39/16* (2013.01); *B65G 15/64* (2013.01)

(58) Field of Classification Search
CPC ................................ B65G 23/44; B65G 39/19
USPC ......................................... 198/806–808, 816
See application file for complete search history.

(56) References Cited

U.S. PATENT DOCUMENTS

| | | | | |
|---|---|---|---|---|
| 3,118,314 A | * | 1/1964 | Schuster | F16H 7/02 226/22 |
| 4,174,171 A | * | 11/1979 | Hamaker | G03G 15/755 226/23 |
| 4,421,228 A | * | 12/1983 | Marsiglio | B65H 23/02 198/840 |
| 5,659,851 A | * | 8/1997 | Moe | G03G 15/755 226/170 |
| 5,717,984 A | * | 2/1998 | Wong | B65G 39/16 399/165 |
| 6,131,726 A | * | 10/2000 | Hovsto | B65G 39/16 198/840 |
| 6,181,900 B1 | * | 1/2001 | Lee | G03G 15/755 399/165 |

(Continued)

FOREIGN PATENT DOCUMENTS

WO WO-9918018 A1 * 4/1999 ............. B65G 39/16

*Primary Examiner* — Mark A Deuble
(74) *Attorney, Agent, or Firm* — Davis Graham & Stubbs LLP (57) ABSTRACT

A self-aligning belt pulley, in various embodiments, includes a cylindrical roller having one or more concave portions formed in a circumferential rolling surface. In some embodiments, one or more raised peaks extend circumferentially along, and radially outwardly from, the circumferential roller surface. In various embodiments, a cylindrical roller couples with a pivoting mechanism having an elongated member that is offset and parallel to the circumferential rolling surface. The elongated member has a centrally located connection point that permits a pivoting bracket to be attached to it, thereby creating a pivot point that is anchored at an opposite end portion and automatically adjusts a position of the cylindrical roller. The pivoting mechanism may also function as a tensioning device.

30 Claims, 10 Drawing Sheets

(56) References Cited

U.S. PATENT DOCUMENTS

| | | | | |
|---|---|---|---|---|
| 6,267,228 B1* | 7/2001 | Cadwell | ............... | B65G 23/44 |
| | | | | 198/816 |
| 7,070,042 B2* | 7/2006 | Dow | ............... | F16G 3/06 |
| | | | | 198/835 |
| 7,448,491 B1* | 11/2008 | Tippery | ............... | A01D 57/20 |
| | | | | 198/813 |
| 7,565,967 B2* | 7/2009 | Maine, Jr. | ............... | B65G 23/06 |
| | | | | 198/848 |
| 7,866,462 B2* | 1/2011 | DeMong | ............... | E21F 13/083 |
| | | | | 198/300 |
| 9,114,643 B2* | 8/2015 | Yasumoto | ............... | B41J 11/007 |

* cited by examiner

SELF-ALIGNING BELT PULLEY

CROSS-REFERENCE TO RELATED APPLICATIONS

The present application is a non-provisional of U.S. Provisional Patent Application Ser. No. 63/344,212, titled "Self-Aligning Belt Pulley With Pivoting Mechanism", filed May 20, 2022, which is incorporated herein as if set out in full.

BACKGROUND

Conveyor systems are employed to move material or product from one location to another location. A conveyor system may include a belt, frame, drive pulley, tail pulley and one or more idler pulleys. The frame of the conveyor system may include two opposing guide rails. The pulleys are commonly mounted between the two opposing guide rails, which support the pulleys in a fixed plane.

The two opposing guide rails typically include a slot or slide mechanism that allows limited movement of the pulley to adjust the conveyor belt tension. In the instance of a tail pulley, individual tighteners are typically connected to each end of the tail pulley and attached to the frame of the conveyor system. The tighteners are typically adjusted, individually, to apply equal tension to the belt. The equal tension helps to prevent misalignment and slippage of the belt. Misalignment of a belt within a conveyor system causes unnecessary wear to the conveyor components, reduced load capacity, and potential spillage of the material or product being conveyed. However, individual alignment of the tighteners can be time consuming and is commonly subject to human error.

Misalignment of the belt may be exacerbated when a conveyor system rests on an uneven surface, as is often found in agricultural or mining operations. This condition causes the frame of the conveyor system to twist, which forces one or more of the pulleys to rest at an angle. Where pulleys are disposed at an angle to the normal plane of the conveyor system, a high side of the one or more pulleys is created. This can cause the belt to misalign, slip, and experience uneven wear.

Accordingly, what is needed is a self-aligning belt pulley that resists misalignment of a conveyor belt within a conveyor system, even when the conveyor system rests on an uneven surface.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

The present disclosure provides a self-aligning belt pulley for use in a conveyor system. In various embodiments, the self-aligning belt pulley may include a cylindrical roller with a circumferential roller surface with one or more concave portions formed within the circumferential roller surface. In some embodiments, the self-aligning belt pulley of the present technology may include a pivot point mechanism, having an elongated frame member with a central connection point. In particular embodiments, a pivot bracket is pivotably coupled with the connection point. The pivoting mechanism may further include a tensioning means operatively coupled with the pivot bracket for selectively applying tension to the elongated frame member and cylindrical roller. In some embodiments, the tensioning means includes an adjustment stem coupled with the pivot bracket and an anchor point. Rotation of the adjustment stem in one direction draws the pivot bracket toward the anchor point and rotation of the adjustment stem in an opposite, second direction increases a distance between the pivot bracket and the anchor point. The anchor point, in any of the various embodiments, may be provided as one of various stable structures or pieces of equipment, which may be fixed in position or selectively moveable.

The self-aligning belt pulley of the present technology may be implemented within various conveyor systems as one or a combination of a drive pulley, tail pulley, or idler pulley. It is further contemplated that the self-aligning belt pulley may be constructed in several configurations. In one embodiment, the self-aligning belt pulley is configured as a winged pulley. In other embodiments, the self-aligning belt pulley may be configured to have a hollow or solid construction.

These and other aspects of the present system and method will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

The present disclosure is directed to a self-aligning belt pulley 10 for use in a conveyor system. In various embodiments, the self-aligning belt pulley 10 is provided with a cylindrical roller 12. In particular embodiments, the cylindrical roller 12 includes one or more concave portions 14 formed therein. In some embodiments, the self-aligning belt pulley 10 is further provided with a pivot mechanism that is operatively coupled with the cylindrical roller 12. It is contemplated that the self-aligning belt pulley 10 may be implemented within various types of conveyor systems. Within such conveyor systems, the self-aligning belt pulley 10 of the present technology may be provided as a drive pulley, tail pulley, or idler pulley. It is contemplated that the self-aligning belt pulley 10, and in particular the cylindrical roller 12, may be constructed in several configurations that may include a winged pulley, a hollow pulley, and a solid pulley. It is further contemplated that the self-aligning belt pulley 10, and its component parts, may be formed from various types of rigid materials, or combinations thereof; the types of rigid materials including metal, steel, plastic, composites, rubber, and the like.

With reference to FIG. 1-10, embodiments of a self-aligning belt pulley 10 are depicted according to aspects of the present disclosure. With specific reference to FIG. 1, the self-aligning belt pulley 10 includes a cylindrical roller 12, having a circumferential roller surface 18. The exemplary embodiments depicted in FIGS. 1 and 3-8, include a cylindrical roller 12 that is configured as a part of a winged pulley, which includes a discontinuous, circumferential roller surface 18 due to the separated wings 20. However, contemplated embodiments of the present technology may include a cylindrical roller 12 having a continuous, circumferential roller surface 18. Regardless of its general construction, various embodiments of the cylindrical roller 12 include at least one concave portion 14 defined within the circumferential roller surface 18. While the exemplary embodiment, depicted in FIGS. 1-6, is shown with two concave portions 14, it is contemplated that more or fewer concave portions 14 may be formed within the circumferential roller surface 18. For example, the circumferential roller surface 18 may include one, two, three, four, or more concave portions 14 across a length of a cylindrical roller 12. The exemplary embodiment is further depicted as having concave portions 14 that are formed linearly and continuously around the circumferential roller surface 18. It is contemplated, however, that a plurality of concave portions 14 may be formed to, individually, extend less than completely around the circumferential roller surface 18. Rather, the plurality of concave portions 14 may be positioned adjacent one another, aligned with one another, in patterns, or randomly disposed. In some embodiments, the concave portions 14 may be of equal size and may be symmetrically formed. However, in other embodiments, the concave portions 14 may be dissimilar in size and shape from one another.

Figure 1:
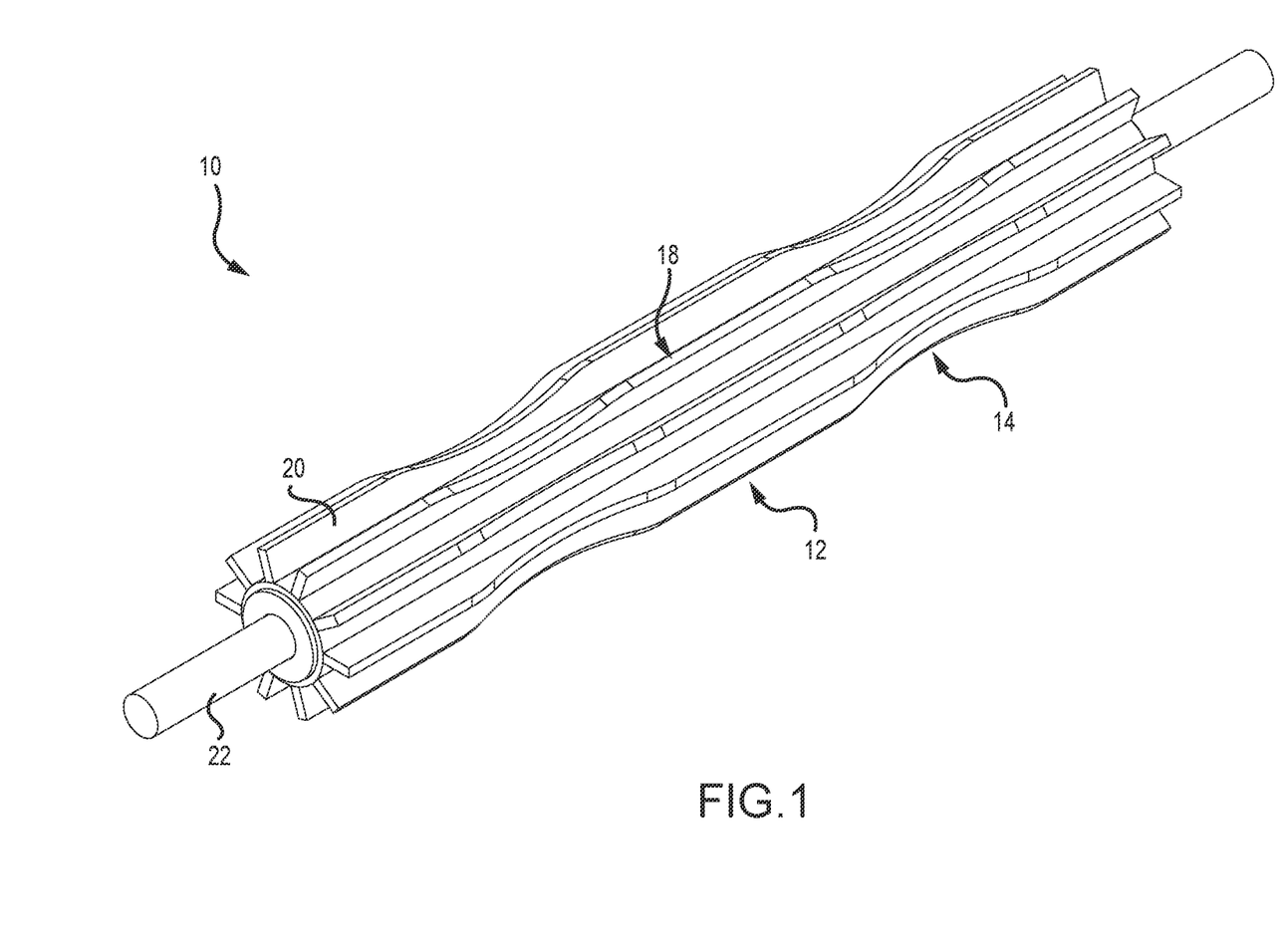
FIG. 1 depicts an isometric view of one embodiment of a cylindrical roller, which may form a part of the self-aligning belt pulley of the present technology, as the same could be configured as a winged pulley.
Figure 2:
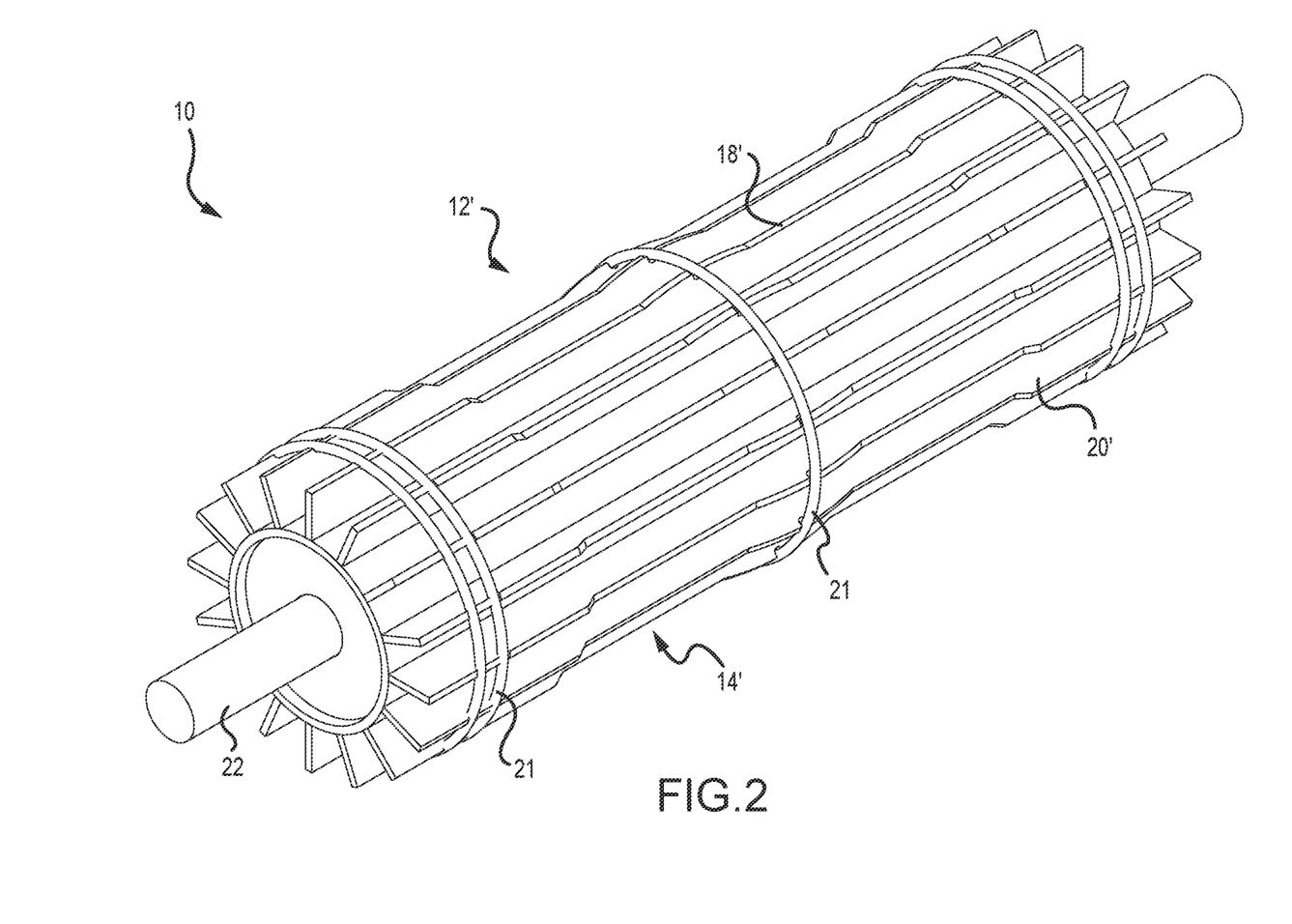
FIG. 2 depicts an isometric view of another embodiment of a cylindrical roller, which may form a part of the self-aligning belt pulley of the present technology, as the same could be configured as another winged pulley.

With reference to FIG. 2, embodiments of the self-aligning belt pulley 10 may include a cylindrical roller 12', having a circumferential roller surface 18'. As with FIG. 1, the exemplary embodiment is depicted in FIG. 2 as winged pulley, which includes a discontinuous, circumferential roller surface 18' due to the separated wings 20'. However, cylindrical roller 12' may be configured to have a continuous, circumferential roller surface 18'. The cylindrical roller 12' includes two concave portions 14' defined within the circumferential roller surface 18'. However, it is contemplated that more or fewer concave portions 14' may be formed within the circumferential roller surface 18'. As with the cylindrical roller 12, it is contemplated that one or more concave portions 14' may be formed to, individually, extend less than completely around the circumferential roller surface 18'. The plurality of concave portions 14' may be positioned adjacent one another, aligned with one another, in patterns, or randomly disposed. In some embodiments, the concave portions 14' may be of equal size and may be symmetrically formed. However, in other embodiments, the concave portions 14' may be dissimilar in size and shape from one another. The exemplary embodiment is further depicted as having raised peaks 21, which extend circumferentially along, and radially outwardly from, the circumferential roller surface 18'. In the depicted embodiment, the raised peaks 21 are formed from bars that extend circumferentially along the circumferential roller surface 18', connecting the wings 20'. However, it is contemplated that the raised peaks 21 may be defined by a plurality of circumferentially spaced-apart segments that extend along the circumferential roller surface 18'. It is further contemplated that the raised peaks 21 can be formed in unitary construction with portions, or the entirety, of the cylindrical roller 12'. As the exemplary embodiment depicts, the raised peaks 21 may be singularly disposed in a given area of the cylindrical roller 12', such as in the intermediate area of cylindrical roller 12'. However, the raised peaks 21 may be grouped in pairs, or more than two, adjacent one another, such as depicted near the opposite end portions of the cylindrical roller 12'.

A conveyor belt run along the surface of a conventional pulley tends to travel to the high side of the pulley, causing the belt to form a banana shape that contributes to belt misalignment. The self-aligning belt pulley 10 prevents the belt from moving laterally across the surface of the pulleys. By providing the cylindrical roller 12, 12' with at least one concave portion 14, 14', and/or raised peaks 21, "high" and "low" portions are defined within the circumferential roller surface 18, 18'. In the depicted, exemplary embodiments of FIGS. 1-6, high portions are created at the opposite end portions of the cylindrical roller 12, 12' and one in an intermediate portion of the cylindrical roller 12, 12'. It is believed that the high portions tend to constantly draw a conveyor belt, moving along the conveyor, toward the high portions. The belt remains, therefore, in a generally central location along the cylindrical roller 12, 12' since high portions are positioned to mirror one another along the cylindrical roller 12, 12'. In such a fashion, the high portions adjacent the concave portions 14, 14', and/or raised peaks 21, inhibit side-to-side movement of the belt of a conveyor system, even where the conveyor system is operating at a minor transverse angle of incline. This can be of particular benefit where the conveyor system rests on an uneven surface, such as in agricultural or mining operations.

With reference to FIGS. 1-6, an opposing pair of spindles 22 extend axially, outwardly from opposing end portions of the cylindrical roller 12, 12'. It is to be understood that "an opposing pair of spindles," as used herein, may mean two separate spindle structures, but may also simply mean a single spindle structure that extends through the cylindrical roller along an axis of rotation, presenting two end portions. Each spindle 22 is connected to one of an opposing pair of roller brackets 24 that allow the cylindrical roller 12, 12' to rotate freely about a rotation axis extending through the opposing pair of spindles 22. The opposing pair of roller brackets 24 couple the cylindrical roller 12, 12' with opposing rails of a conveyor system frame 26, which supports the self-aligning belt pulley 10 in a fixed plane. In particular embodiments, the opposing pair of roller brackets 24 are shaped to slide within slots 28 formed in the opposing rails of the conveyor system frame 26, along a tensioning axis that is generally perpendicular to the axis of rotation for the cylindrical roller 12, 12'. Accordingly, sliding the opposing pair of roller brackets 24 in a forward direction will draw the cylindrical roller 12, 12' forward and tend to reduce a tension on a conveyor belt. Sliding the opposing pair of roller brackets 24 in an opposite, rearward direction within the conveyor system frame 26 will move the cylindrical roller 12, 12' rearwardly, tending to increase the tension on the conveyor belt. It is contemplated that the opposing pair of roller brackets 24 may fit within the slots 28 such that minor, independent movement of one of the roller brackets forward or rearward of the opposite roller bracket 24 is permitted.

Figure 3:
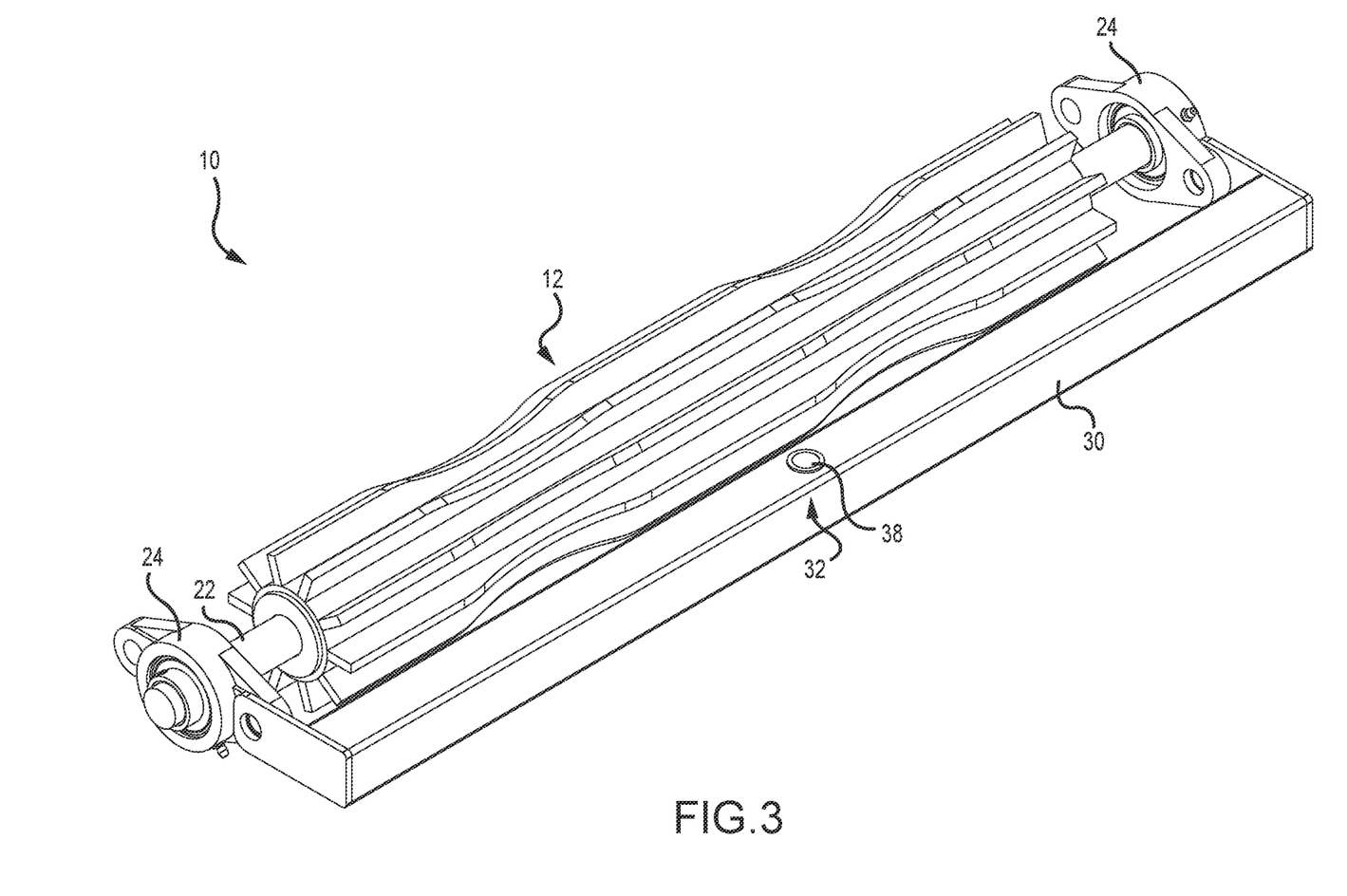
FIG. 3 depicts an isometric view of the self-aligning belt pulley of FIG. 1 as the same could include an elongated member, having a pivot point.

In various embodiments, a pivot mechanism is operatively coupled with the cylindrical roller 12, 12'. With reference to FIG. 3, the pivot mechanism may include an elongated frame member 30 with opposite end portions and a connection point 32 intermediate the opposite end portions. In particular embodiments, the elongated frame member 30 is offset and parallel to the circumferential roller surface 18, 18' of the cylindrical roller 12, 12'. Each of the opposing pair of roller brackets 24 are coupled with an opposite end portion of the elongated frame member 30. Accordingly, movement of the cylindrical roller 12, 12' and the elongated frame member 30, in forward, rearward, and in angular directions with respect to the tensioning axis, will be the same. In various embodiments, a pivot bracket 34 is operatively, pivotably coupled with the connection point 32. In some embodiments, a mounting pin 36 is operatively coupled with the pivot bracket 34 and the elongated frame member 30 such that the pivot bracket 34 may selectively pivot with respect to the elongated frame member 30. In such embodiments, the connection point 32 may be provided with a centrally located aperture 38 that extends perpendicularly through the elongated frame member 30. In some embodiments, and with reference to FIG. 5, a mounting collar 40 is coupled with the connection point 32 of the elongated frame member 30. In such embodiments, the mounting collar 40 is shaped to pivotably receive the mounting pin 36.

Figure 4:
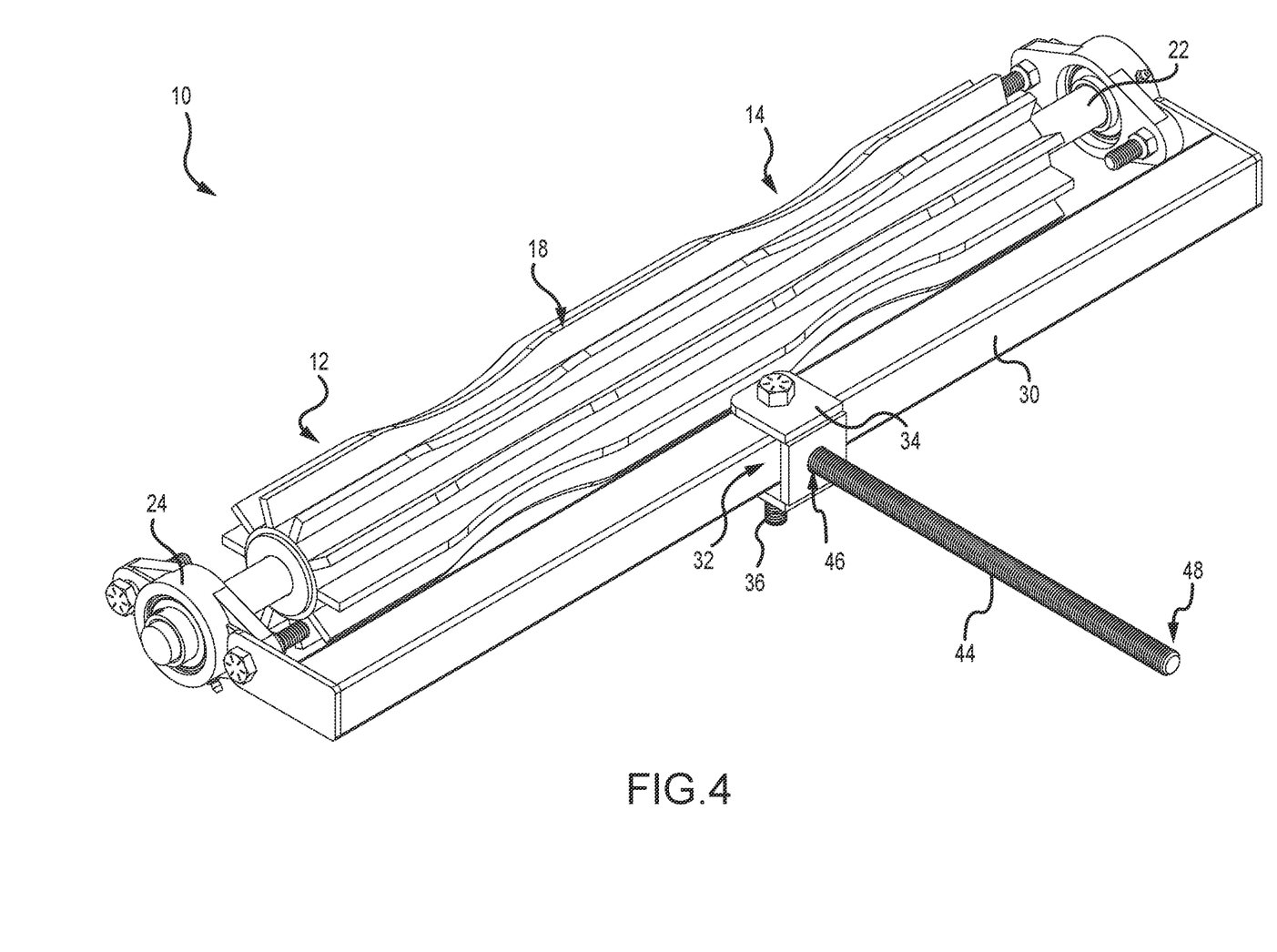
FIG. 4 depicts an isometric view of the self-aligning belt pulley of FIG. 3 as the same could include a portion of one embodiment of an anchoring and tensioning system.
Figure 5:
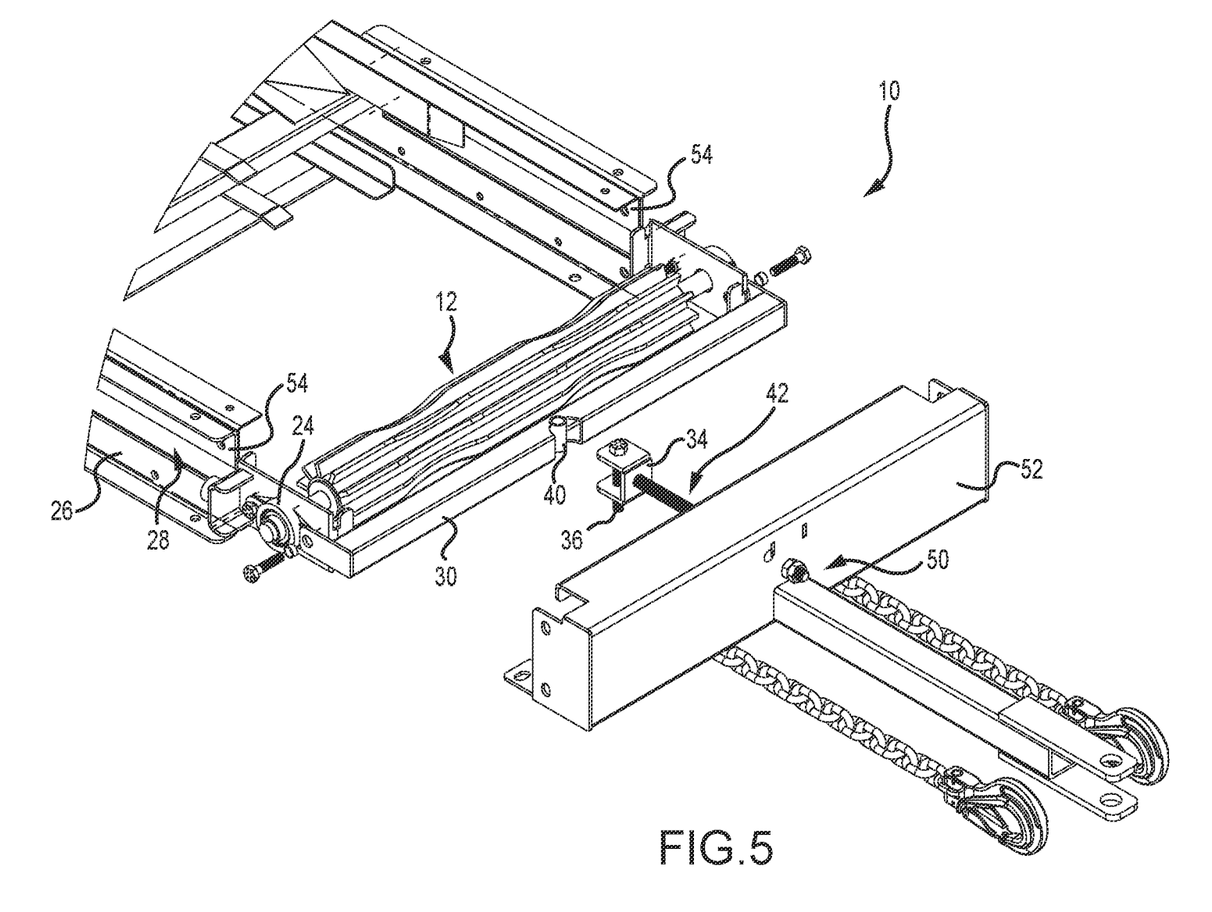
FIG. 5 depicts a partially exploded, isometric view of an embodiment of the self-aligning belt pulley of the present technology as the same could be associated with a conveyor system.
Figure 6:
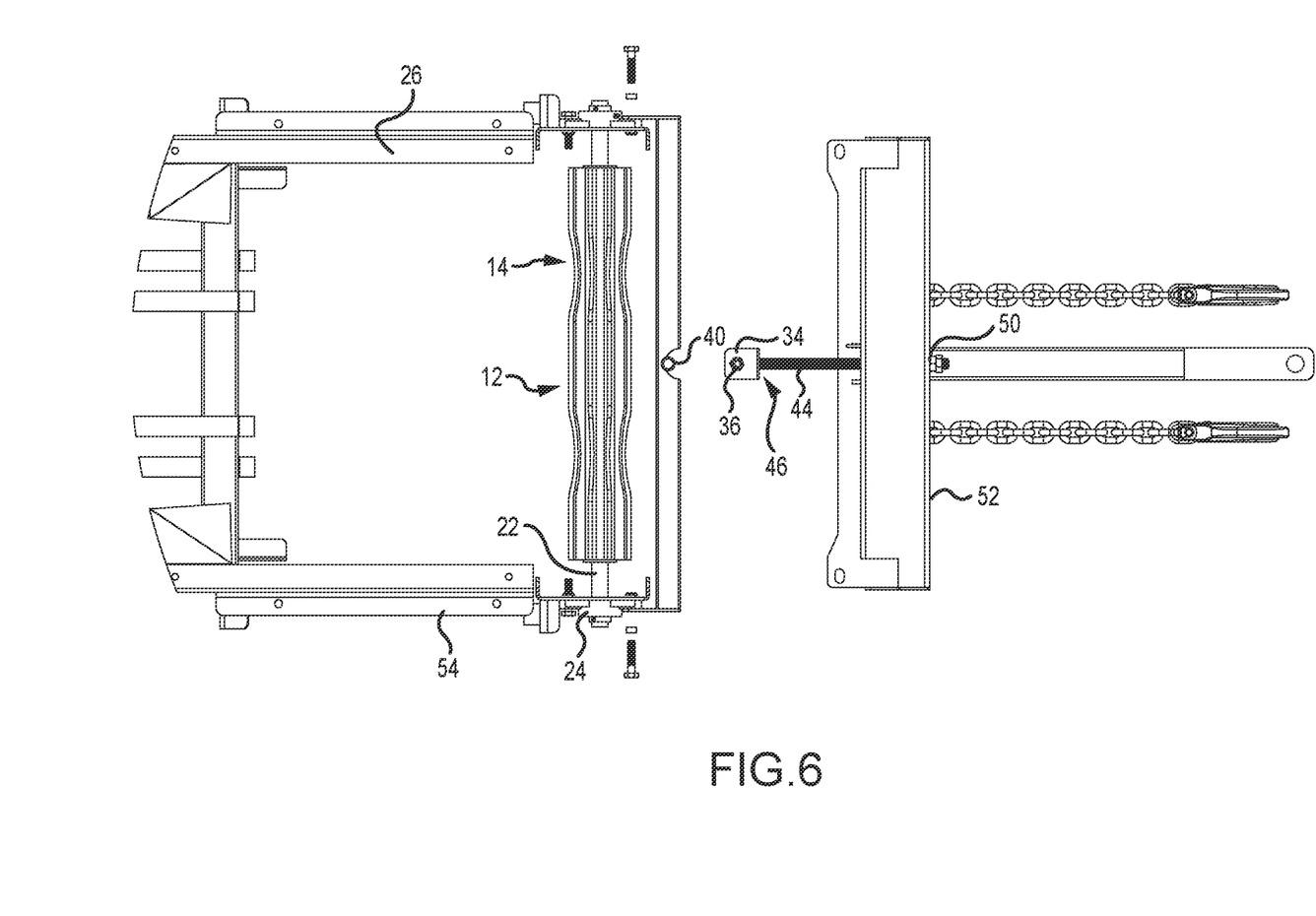
FIG. 6 depicts a partially exploded, top plan view of the self-aligning belt pulley of FIG. 5.

With reference to FIGS. 4-6, the pivoting mechanism may further include a tensioning means 42 operatively coupled with the pivot bracket 34 for selectively applying tension to the elongated frame member 30 and cylindrical roller 12, 12'. In some embodiments, the tensioning means 42 includes an adjustment stem 44 having a proximal end portion 46 and a distal end portion 48, wherein the proximal end portion 46 is operatively coupled with the pivot bracket 34 and the distal end portion 48 of the adjustment stem 44 is operatively coupled with an anchor point 50. In the depicted embodiment, the anchor point 50 is provided by tail frame member 52, which couples with a rearward end portion of the conveyor system frame 26 via tail mounting brackets 54. It is contemplated, however, that the anchor point 50, in any of the various embodiments, may be provided as one of various stable structures or pieces of equipment, which may be fixed in position or selectively moveable. The adjustment stem 44 may be threaded, such that rotation of the adjustment stem 44 in one direction draws the pivot bracket 34 toward the anchor point 50, increasing tension on the conveyor belt, and rotation of the adjustment stem 44 in an opposite, second direction increases a distance between the pivot bracket 34 and the anchor point 50, decreasing tension on the conveyor belt. In some embodiments, the tensioning means 42 includes a winch device (not depicted) operatively coupled with the pivot bracket 34 and an anchor point 50. Actuation of the winch device in a first mode draws the pivot bracket 34 toward the anchor point 50 and actuation of the winch device in an opposite, second mode decreases a tension between the pivot bracket 34 and the anchor point 50. In other embodiments, the tensioning means 42 includes a hydraulic cylinder (not depicted) operatively coupled with the pivot bracket 34 and the anchor point 50. Actuation of the hydraulic cylinder in a first mode draws the pivot bracket 34 toward the anchor point 50 and actuation of the hydraulic cylinder in an opposite, second mode increases a distance between the pivot bracket 34 and the anchor point 50.

Figure 7:
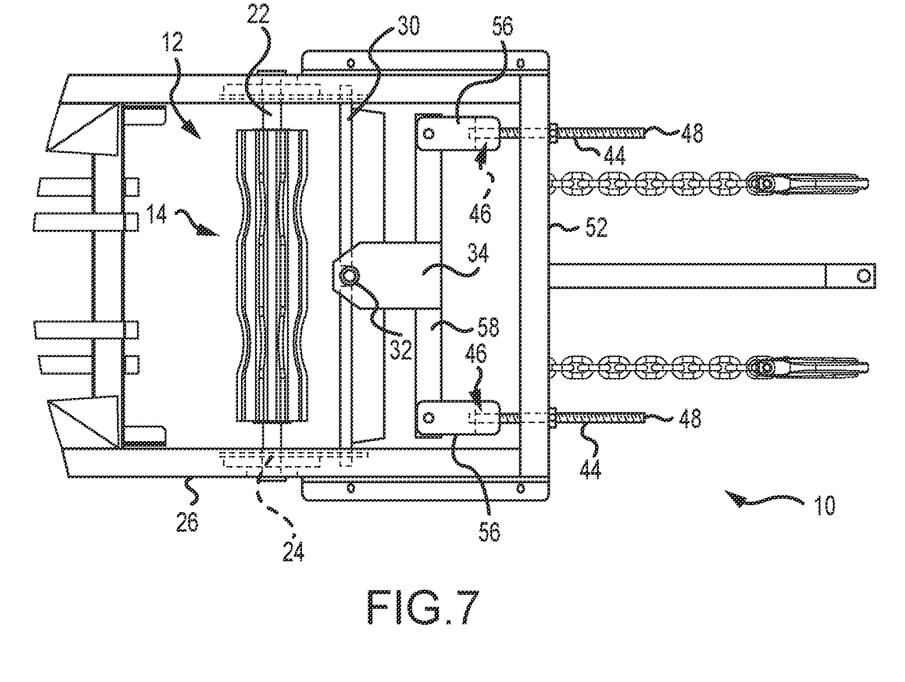
FIG. 7 depicts a top, plan view of another embodiment of the self-aligning belt pulley of the present technology as the same could be associated with a conveyor system.

With reference to FIG. 7, the pivoting mechanism includes a tensioning means 42 that is operatively coupled with the pivot bracket 34 for selectively applying tension to the elongated frame member 30 and cylindrical roller 12, 12'. In the depicted embodiment, however, the tensioning means 42 includes a pair of adjustment stems 44, each having a proximal end portion 46 and a distal end portion 48. The proximal end portions 46 of the adjustment stems 44 are each operatively coupled with a mounting plate 56. The mounting plates 56 are operatively coupled with a tensioning frame member 58, adjacent opposite end portions of the tensioning frame member 58. In particular embodiments, the mounting plates 56 pivotably mounted to the tensioning frame member 58. The tensioning frame member 58 is coupled with a pivot bracket 34, which may be provided in various shapes and sizes as required by the particular application. The distal end portions 48 of the adjustment stems 44 are operatively coupled with an anchor point such as a tail frame member 52, or one of various stable structures or pieces of equipment, which may be fixed in position or selectively moveable. The adjustment stems 44 may be threaded, such that rotation of the adjustment stems 44 in one direction draws the pivot bracket 34 toward the anchor point, increasing tension on the conveyor belt, and rotation of the adjustment stems 44 in an opposite, second direction increases a distance between the pivot bracket 34 and the anchor point, decreasing tension on the conveyor belt. It is contemplated that the adjustment stems 44 may be adjusted to similar degrees, varying degrees, or in opposite directions, as dictated by the adjustment needs of the system.

Figure 8:
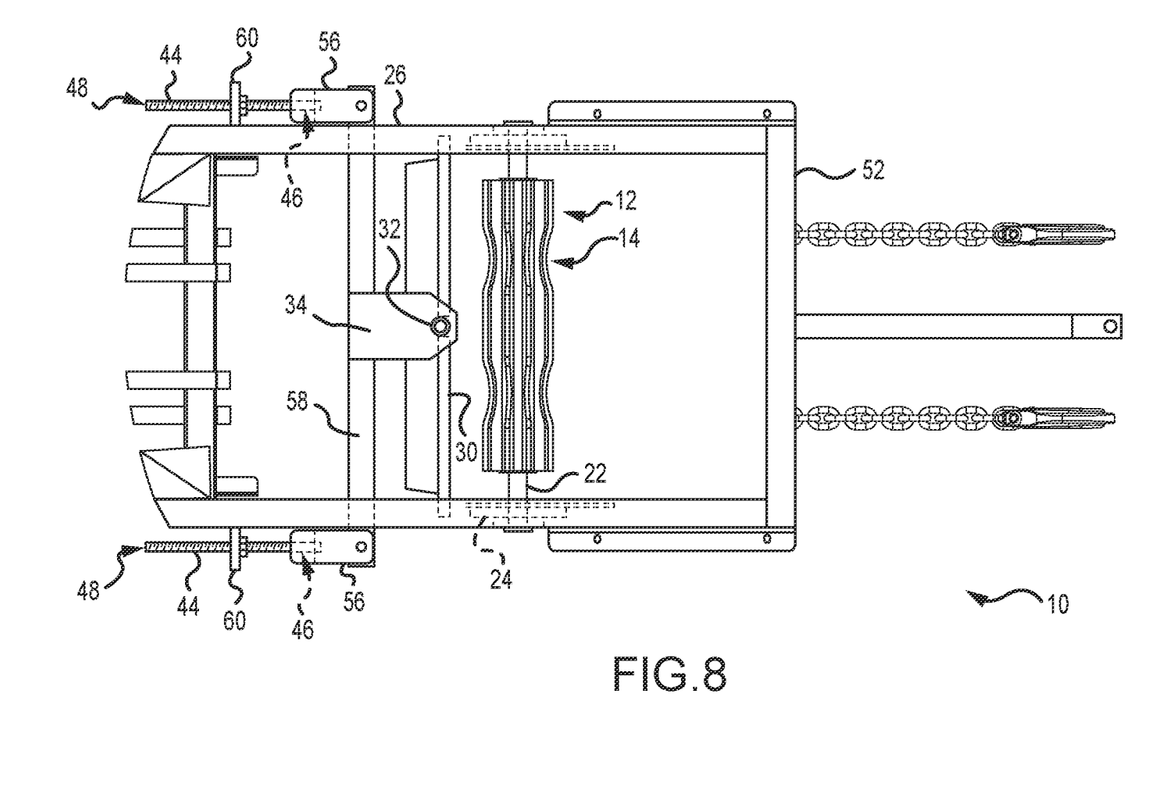
FIG. 8 depicts a top, plan view of yet another embodiment of the self-aligning belt pulley of the present technology as the same could be associated with a conveyor system.

With reference to FIG. 8, the pivoting mechanism includes a tensioning means 42 that is operatively coupled with the pivot bracket 34 for selectively applying tension to the elongated frame member 30 and cylindrical roller 12, 12'. In the depicted embodiment, however, the tensioning means 42 is positioned forward from the elongated frame member 30 and cylindrical roller 12, 12'. In this manner, tension is applied via a "push" of the elongated frame member 30 and cylindrical roller 12, 12' and not a "pull."

The depicted embodiment includes a pair of adjustment stems 44, each having a proximal end portion 46 and a distal end portion 48. The proximal end portions 46 of the adjustment stems 44 are each operatively coupled with a mounting plate 56. The mounting plates 56 are operatively coupled with a tensioning frame member 58, adjacent opposite end portions of the tensioning frame member 58. In particular embodiments, the mounting plates 56 pivotably mounted to the tensioning frame member 58. The tensioning frame member 58 is coupled with a pivot bracket 34. The distal end portions 48 of the adjustment stems 44 are operatively coupled with an anchor point, which in the depicted embodiment is presented in the form of a pair of anchor brackets 60 that are coupled with the conveyor frame system 26. The adjustment stems 44 may be threaded, such that rotation of the adjustment stems 44 in one direction draws the pivot bracket 34 toward the anchor brackets 60, decreasing tension on the conveyor belt. Rotation of the adjustment stems 44 in an opposite, second direction increases a distance between the pivot bracket 34 and the anchor brackets 60, increasing tension on the conveyor belt. It is contemplated that the adjustment stems 44 may be adjusted to similar degrees, varying degrees, or in opposite directions, as dictated by the adjustment needs of the system.

Figure 9:
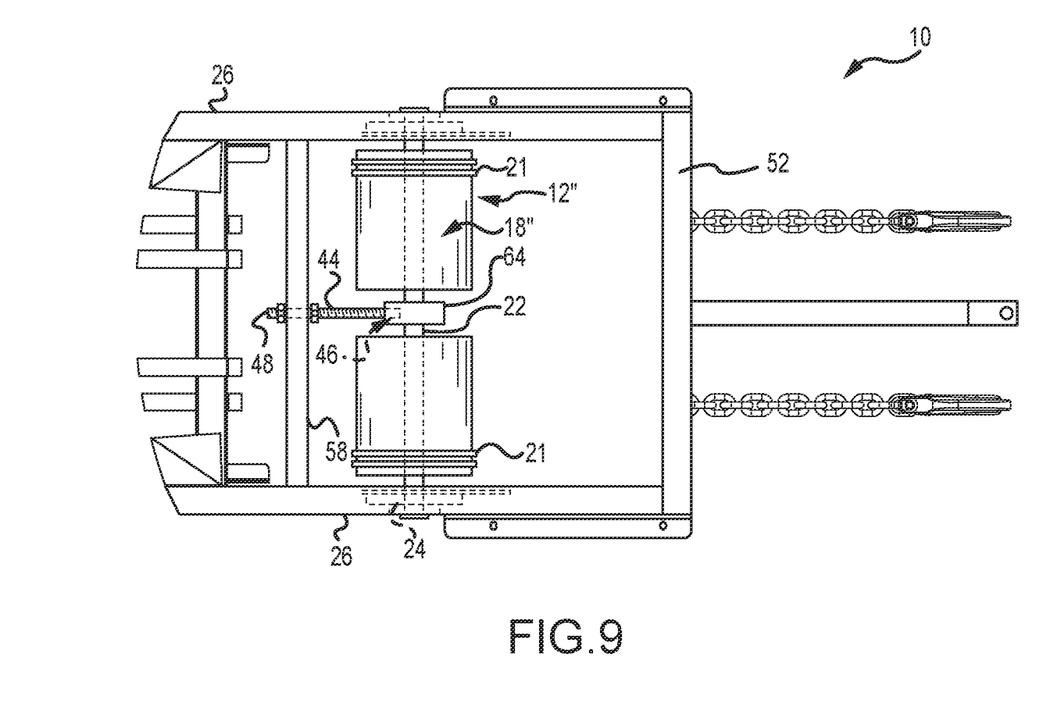
FIG. 9 depicts a top, plan view of still another embodiment of the self-aligning belt pulley of the present technology as the same could be associated with a conveyor system.
Figure 10:
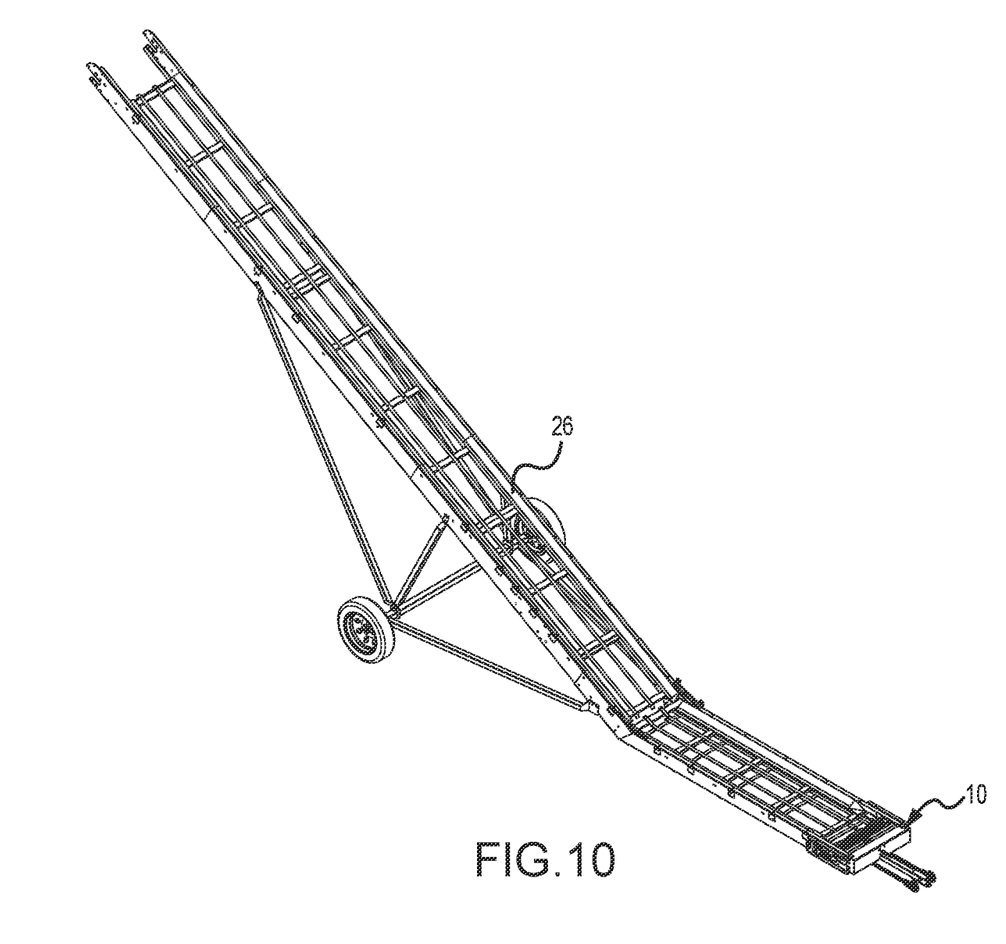
FIG. 10 depicts a perspective view of one embodiment of the self-aligning belt pulley of the present technology as the same could be associated with a conveyor system in a tail pulley application.

With reference to FIG. 9, the self-aligning belt pulley 10 includes a cylindrical roller 12", having a circumferential roller surface 18". The depicted exemplary embodiment includes a cylindrical roller 12" that is configured as a drum pulley, separated into two halves, which are spaced apart from one another on spindle 22. Each half of cylindrical roller 12" includes a continuous, circumferential roller surface 18". However, contemplated embodiments of the present technology may include a cylindrical roller 12 having a discontinuous, circumferential roller surface 18", such as with the winged pulley design of cylindrical roller 12, 12'. It is contemplated that one or more concave portions 14, of various shapes and sizes, may be formed within the circumferential roller surfaces 18". The depicted exemplary embodiment, however, includes raised peaks 21, which extend circumferentially along, and radially outwardly from, the circumferential roller surfaces 18". In the depicted embodiment, the raised peaks 21 are formed from bars that extend circumferentially along the circumferential roller surface 18". However, it is contemplated that the raised peaks 21 may be defined by a plurality of circumferentially spaced-apart segments that extend along the circumferential roller surface 18". It is further contemplated that the raised peaks 21 can be formed in unitary construction with portions, or the entirety, of the halves of the cylindrical roller 12". As the exemplary embodiment depicts, the raised peaks 21 may be disposed in pairs, adjacent the outward end portions of the halves of the cylindrical roller 12". However, the raised peaks 21 may be provided in configurations of one, two, or more than two, adjacent one another, at different locations along lengths of the halves of the cylindrical roller 12".

A spindle 22 extends through the cylindrical roller 12", such that it is exposed between the halves of the cylindrical roller 12" and presents as an opposing pair of end portions that extend axially, outwardly from opposing end portions of the cylindrical roller 12". Each end portion of the spindle 22 is connected to one of an opposing pair of roller brackets 24 that allow the cylindrical roller 12" to rotate freely about a rotation axis extending through the spindle 22. The opposing pair of roller brackets 24 couple the cylindrical roller 12" with opposing rails of the conveyor system frame 26. The opposing pair of roller brackets 24 are shaped to slide within slots 28 formed in the opposing rails of the conveyor system frame 26, along a tensioning axis that is generally perpendicular to the axis of rotation for the cylindrical roller 12". Accordingly, sliding the opposing pair of roller brackets 24 in a forward direction will draw the cylindrical roller 12" forward and tend to reduce a tension on a conveyor belt. Sliding the opposing pair of roller brackets 24 in an opposite, rearward direction within the conveyor system frame 26 will move the cylindrical roller 12" rearwardly, tending to increase the tension on the conveyor belt. It is contemplated that the opposing pair of roller brackets 24 may fit within the slots 28 such that minor, independent movement of one of the roller brackets forward or rearward of the opposite roller bracket 24 is permitted.

With continued reference to FIG. 9, a pivot mechanism is operatively coupled with the cylindrical roller 12". In the depicted embodiment, the pivot mechanism includes an elongated frame member 62, which is offset and generally parallel to the circumferential roller surface 18" of the cylindrical roller 12". Opposite end portions of the elongated frame member 62 are coupled with the conveyor system frame 26 in a rigid manner. A tensioning means 42 is operatively coupled at one end portion with the elongated frame member 62 and, at an opposite end portion to an intermediate portion of spindle 22, between the halves of the cylindrical roller 12". In the depicted embodiment, the tensioning means 42 is positioned forward from the cylindrical roller 12". In this manner, tension is applied via a "push" of the elongated frame member 30 and cylindrical roller 12, 12' and not a "pull." The depicted embodiment includes an adjustment stem 44, having a proximal end portion 46 and a distal end portion 48. The proximal end portion 46 of the adjustment stem 44 is coupled with a bearing 64. The spindle 22 is journaled with the bearing 64. In this position, the bearing 64 becomes a pivot point from which the spindle and cylindrical roller 12" may deviate from the generally parallel relationship with the elongated frame member 62, as needed. The adjustment stem 44 may be threaded, such that rotation of the adjustment stem 44 in one direction draws the bearing 64 toward the elongated frame member 62, decreasing tension on the conveyor belt. Rotation of the adjustment stem 44 in an opposite, second direction increases a distance between the bearing 64 toward the elongated frame member 62, increasing tension on the conveyor belt.

In certain applications, the pivoting mechanism may also serve to apply variable pressure to the conveyor belt of a conveyor system in different operating conditions. In particular applications, the pivoting mechanism allows some limited angular motion of the cylindrical roller 12, 12', 12", with respect to the rotation axis and/or the tensioning axis. As such, the pivoting mechanism automatically makes minor adjustments in response to the conveyor system resting on an uneven surface, as is often found in agricultural or mining operations. These minor, pivoting adjustments further maintain the conveyor belt on the pulleys, alone, or in conjunction with the alignment created by the one or more concave portions 14, 14' and/or raised peaks 21. It is contemplated that the concave portions 14, 14' may serve to intensify the movement of the belt over the circumferential roller surface 18, 18', 18", allowing the pivoting mechanism to respond quickly and inhibit side-to-side movement of a belt on a conveyor system.

Although the technology has been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A self-aligning belt pulley, comprising:
a cylindrical roller having a circumferential roller surface; and
a pivot mechanism operatively coupled with the cylindrical roller; the pivot mechanism comprising:
an elongated frame member with opposite end portions and a connection point intermediate the opposite end portions; the elongated frame member being offset and generally parallel to the roller surface of the cylindrical roller;
a pivot bracket operatively, pivotably coupled with the connection point; the pivot bracket being further operatively coupled with an anchor point and
tensioning means operatively coupled with the bracket for selectively applying tension to the elongated frame member and cylindrical roller from a pivot point.

2. The self-aligning belt pulley of claim 1, wherein:
the pivot mechanism further includes a mounting pin operatively coupled with the bracket and the elongated frame member such that the bracket may selectively pivot with respect to the elongated frame member.

3. The self-aligning belt pulley of claim 2, wherein:
the connection point includes a mounting collar coupled with the connection point of the elongated frame member; the mounting collar being shaped to pivotably receive the mounting pin.

4. The self-aligning belt pulley of claim 1, wherein:
the tensioning means comprises:
an adjustment stem having proximal and distal end portions; the proximal end portion of the adjustment stem being operatively coupled with the bracket; the distal end portion of the adjustment stem being operatively coupled with an anchor point.

5. The self-aligning belt pulley of claim 4, wherein:
opposite end portions of the elongated frame member are rigidly secured with opposite rails of a conveyor system frame.

6. The self-aligning belt pulley of claim 4, wherein:
the adjustment stem is threaded, such that rotation of the adjustment stem in one direction draws the bracket toward the anchor point and rotation of the adjustment stem in an opposite, second direction increases a distance between the bracket and the anchor point.

7. The self-aligning belt pulley of claim 1, wherein:
the tensioning means comprises:
a tensioning frame member having an intermediate portion that is operatively coupled with the pivot bracket;
a pair of adjustment stems, each having proximal and distal end portions; the proximal end portions of the adjustment stems being operatively coupled with opposite end portions of the tensioning frame; the distal end portions of the adjustment stems being operatively coupled with an anchor point.

8. The self-aligning belt pulley of claim 7, wherein:
the tensioning means further comprising:
a pair of mounting plates positioned to couple the proximal end portions of the adjustment stems being with the opposite end portions of the tensioning frame.

9. The self-aligning belt pulley of claim 8, wherein:
the pair of mounting plates are pivotably coupled with the opposite end portions of the tensioning frame.

10. The self-aligning belt pulley of claim 7, wherein:
the tensioning means is positioned rearwardly from the cylindrical roller, such that the tensioning means applies tension by pulling the cylindrical roller toward the tensioning means.

11. The self-aligning belt pulley of claim 7, wherein:
the tensioning means is positioned forward from the cylindrical roller, such that the tensioning means applies tension by pushing the cylindrical roller away from the tensioning means.

12. The self-aligning belt pulley of claim 1, further comprising:
an opposing pair of roller brackets operatively coupled with an opposing pair of spindles, extending outwardly from opposite end portions of the cylindrical roller and defining a rolling axis for the cylindrical roller, such that the cylindrical roller may rotate about the rolling axis.

13. The self-aligning belt pulley of claim 12, wherein:
the opposing pair of roller brackets are configured to slide, in a direction perpendicular with the rolling axis, within a fixed framework of a conveyor system.

14. The self-aligning belt pulley of claim 1, further comprising:
at least one concave portion defined within the circumferential roller surface.

15. The self-aligning belt pulley of claim 1, further comprising:
a pair of concave portions formed linearly and continuously around the circumferential roller surface; the pair of concave portions being positioned symmetrically on opposite sides of an intermediate portion of the circumferential roller surface.

16. The self-aligning belt pulley of claim 15, further comprising:
an adjustment stem having proximal and distal end portions; the proximal end portion of the adjustment stem being operatively coupled with the bracket; the distal end portion of the adjustment stem being operatively coupled with an anchor point; the adjustment stem being threaded, such that rotation of the adjustment stem in one direction draws the bracket toward the anchor point and rotation of the adjustment stem in an opposite, second direction increases a distance between the bracket and the anchor point.

17. The self-aligning belt pulley of claim 1, further comprising:
at least one raised peak that extends circumferentially along, and radially outwardly from, the circumferential roller surface.

18. The self-aligning belt pulley of claim 1, further comprising:
a pair of raised peaks that extends circumferentially along, and radially outwardly from, the circumferential roller surface; the pair of raised peaks being positioned symmetrically on opposite sides of an intermediate portion of the circumferential roller surface.

19. The self-aligning belt pulley of claim 18, further comprising:
a pair of concave portions formed linearly and continuously around the circumferential roller surface; the pair of concave portions being positioned symmetrically on opposite sides of the intermediate portion of the circumferential roller surface.

20. A self-aligning belt pulley, comprising:
a cylindrical roller having a circumferential roller surface; wherein a pair of raised peaks extend circumferentially along, and radially outwardly from, the circumferential roller surface; the pair of raised peaks being positioned symmetrically on opposite sides of an intermediate portion of the circumferential roller surface; wherein at least one raised peak extends circumferentially along, and radially outwardly from, the intermediate portion of the circumferential roller surface; and
a pivot mechanism operatively coupled with the cylindrical roller; the pivot mechanism comprising:
an elongated frame member with opposite end portions and a connection point intermediate the opposite end portions; the elongated frame member being offset and generally parallel to the roller surface of the cylindrical roller;
a pivot bracket operatively, pivotably coupled with the connection point; the pivot bracket being further operatively coupled with an anchor point.

21. A self-aligning belt pulley, comprising:
a cylindrical roller having a circumferential roller surface; a pair of concave portions formed linearly and continuously around the circumferential roller surface; the pair of concave portions being positioned symmetrically on opposite sides of an intermediate portion of the circumferential roller surface; the cylindrical roller being configured to form a winged pulley; and
a pivot mechanism operatively coupled with the cylindrical roller; the pivot mechanism comprising:
an elongated frame member with opposite end portions and a connection point intermediate the opposite end portions; the elongated frame member being offset and generally parallel to the roller surface of the cylindrical roller;
a pivot bracket operatively, pivotably coupled with the connection point; the pivot bracket being further operatively coupled with an anchor point.

22. A self-aligning belt pulley for use within a conveyor system, the self-aligning belt pulley comprising:
a cylindrical roller having a circumferential roller surface;
an opposing pair of spindles extending outwardly from opposite end portions of the cylindrical roller and defining a rolling axis for the cylindrical roller;
an opposing pair of roller brackets operatively coupled with the opposing pair of spindles such that the cylindrical roller may rotate about the rolling axis; the opposing pair of roller brackets being configured to slide, in a direction perpendicular with the rolling axis, within a fixed framework of the conveyor system;
a pivot mechanism operatively coupled with the cylindrical roller; the pivot mechanism comprising:
an elongated frame member with opposite end portions and a connection point intermediate the opposite end portions; the elongated frame member being offset and parallel to the roller surface of the cylindrical roller; the opposite end portions of the elongated frame member being operatively coupled with the opposing pair of roller brackets;
a pivot bracket operatively, pivotably coupled with the connection point; the pivot bracket being further operatively coupled with an anchor point; and
an adjustment stem having proximal and distal end portions; the proximal end portion of the adjustment stem being operatively coupled with the pivot bracket; the distal end portion of the adjustment stem being operatively coupled with an anchor point; the adjustment stem being threaded, such that rotation of the adjustment stem in one direction draws the pivot bracket toward the anchor point and rotation of the adjustment stem in an opposite, second direction increases a distance between the pivot bracket and the anchor point.

23. The self-aligning belt pulley of claim 22, further comprising:
a pair of concave portions formed linearly and continuously around the circumferential roller surface; the pair of concave portions being positioned symmetrically on opposite sides of an intermediate portion of the circumferential roller surface.

24. The self-aligning belt pulley of claim 22, further comprising:
a pair of raised peaks that extends circumferentially along, and radially outwardly from, the circumferential roller surface; the pair of raised peaks being positioned symmetrically on opposite sides of an intermediate portion of the circumferential roller surface.

25. The self-aligning belt pulley of claim 24, further comprising:
a pair of concave portions formed linearly and continuously around the circumferential roller surface; the pair of concave portions being positioned symmetrically on opposite sides of the intermediate portion of the circumferential roller surface.

26. A self-aligning belt pulley for use within a conveyor system, the self-aligning belt pulley comprising:
a cylindrical roller having a circumferential roller surface; a pair of raised peaks extending circumferentially along, and radially outwardly from, the circumferential roller surface; the pair of raised peaks being positioned symmetrically on opposite sides of an intermediate portion of the circumferential roller surface; at least one raised peak extending circumferentially along, and radially outwardly from, the intermediate portion of the circumferential roller surface;
an opposing pair of spindles extending outwardly from opposite end portions of the cylindrical roller and defining a rolling axis for the cylindrical roller;
an opposing pair of roller brackets operatively coupled with the opposing pair of spindles such that the cylindrical roller may rotate about the rolling axis; the opposing pair of roller brackets being configured to slide, in a direction perpendicular with the rolling axis, within a fixed framework of the conveyor system;

a pivot mechanism operatively coupled with the cylindrical roller; the pivot mechanism comprising:

an elongated frame member with opposite end portions and a connection point intermediate the opposite end portions; the elongated frame member being offset and parallel to the roller surface of the cylindrical roller; the opposite end portions of the elongated frame member being operatively coupled with the opposing pair of roller brackets; and a pivot bracket operatively, pivotably coupled with the connection point; the pivot bracket being further operatively coupled with an anchor point.

27. A self-aligning belt pulley for use within a conveyor system, the self-aligning belt pulley comprising:

a cylindrical roller having a circumferential roller surface; and a pivot mechanism operatively coupled with the cylindrical roller; the pivot mechanism comprising:

an elongated frame member with opposite end portions; the elongated frame member being offset from the roller surface of the cylindrical roller; and tensioning means operatively coupled with the elongated frame member for selectively applying tension to the cylindrical roller from a pivot point.

28. The self-aligning belt pulley of claim 27, wherein:

the tensioning means comprises:

an adjustment stem having proximal and distal end portions; the adjustment stem being threaded, such that rotation of the adjustment stem in one direction draws the cylindrical roller toward the tensioning means and rotation of the adjustment stem in an opposite, second direction increases a distance between the cylindrical roller and the tensioning means.

29. The self-aligning belt pulley of claim 28, wherein:

the cylindrical roller is divided into two portions that are positioned in a spaced apart relationship with one another; and the proximal end portion of the adjustment stem is operatively coupled with an intermediate portion of a spindle that extends through the two portions of the cylindrical roller, defining a rolling axis for the cylindrical roller; the distal end portion of the adjustment stem being operatively coupled with an intermediate portion of the elongated frame member.

30. The self-aligning belt pulley of claim 29, wherein:

the proximal end portion of the adjustment stem is coupled with a bearing that is journaled with the intermediate portion of a spindle, such that the cylindrical roller may deviate from a parallel relationship with the elongated frame member.

\* \* \* \* \*